United States Patent [19]

Degeilh

[11] Patent Number: 5,349,014

[45] Date of Patent: Sep. 20, 1994

[54] PROCESS FOR THE PRODUCTION OF POLYVINYL BUTYRAL HAVING IMPROVED PROPERTIES

[75] Inventor: Robert Degeilh, Le Port Marly, France

[73] Assignee: E.I. du Pont de Nemours and Company, Wilmington, Del.

[21] Appl. No.: 24,871

[22] Filed: Mar. 1, 1993

Related U.S. Application Data

[63] Continuation of Ser. No. 835,058, Feb. 11, 1992, abandoned, which is a continuation of Ser. No. 760,447, Jul. 30, 1985, abandoned.

[30] Foreign Application Priority Data

Aug. 2, 1984 [FR] France ................................ 84 12248

[51] Int. Cl.$^5$ .................................................. C08F 8/00
[52] U.S. Cl. ........................................ 525/61; 524/557; 525/60
[58] Field of Search ...................... 525/60, 61; 524/557

[56] References Cited

U.S. PATENT DOCUMENTS

| | | | |
|---|---|---|---|
| 2,345,746 | 2/1942 | Overbaugh | 525/61 |
| 2,668,803 | 9/1950 | Lanlz et al. | 525/61 |
| 2,915,504 | 12/1959 | Berardinelli | 525/61 |
| 3,153,009 | 10/1964 | Rombach | 525/61 |
| 3,631,225 | 12/1971 | Tenney et al. | 525/61 |
| 4,205,146 | 5/1980 | Hermann et al. | 525/61 |
| 4,499,236 | 2/1985 | Hermann et al. | 525/58 |
| 4,533,697 | 8/1985 | Negeilh | 525/61 |

FOREIGN PATENT DOCUMENTS

| | | | |
|---|---|---|---|
| 0469162 | 11/1950 | Canada | 525/61 |
| 0579075 | 7/1959 | Canada | 525/61 |
| 88013 | 9/1983 | European Pat. Off. . | |
| 0130872 | 1/1985 | European Pat. Off. | 525/61 |
| 113868 | 3/1988 | European Pat. Off. . | |
| 0398384 | 5/1964 | Japan | 525/61 |
| 0191701 | 11/1983 | Japan | 525/61 |
| 0191702 | 11/1983 | Japan | 525/61 |
| 0217503 | 12/1983 | Japan | 525/61 |
| 0217504 | 12/1983 | Japan | 525/61 |
| 0015403 | 1/1984 | Japan | 525/61 |
| 0566004 | 2/1943 | United Kingdom | 525/61 |
| 682194 | 11/1952 | United Kingdom | 525/58 |
| 2007677 | 5/1979 | United Kingdom . | |

*Primary Examiner*—Judy M. Reddick

[57] ABSTRACT

A process for the preparation of a polyvinyl butyral having improved properties comprises subjecting a polyvinyl alcohol in an aqueous medium in the presence of butyraldehyde and an acid catalyst and ethoxylated alkylphenol sulfate having the formula

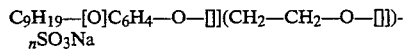

$C_9H_{19}-[O]C_6H_4-O-[]](CH_2-CH_2-O-[])-_nSO_3Na$ where n=6 or n=7 effective as an emulsifier, neutralizing the reaction mixture to a pH of between 9 and 11, and thereafter recovering the polyvinyl butyral by separating it from the reaction liquor and thoroughly washing it with water.

16 Claims, No Drawings

PROCESS FOR THE PRODUCTION OF POLYVINYL BUTYRAL HAVING IMPROVED PROPERTIES

This is a continuation of application Ser. No. 07/835,058, filed Feb. 11, 1992, now abandoned, which is a continuation of application Ser. No. 06/760,447, filed Jul. 30, 1985, now abandoned.

TECHNICAL FIELD

This invention relates to a process for the preparation of polyvinyl butyral having improved properties. This process is adapted to the preparation of polyvinyl butyral of fine particle size and of high quality. Polyvinyl butyral sheeting made from this polyvinyl butyral product is resistant, homogeneous, of good breaking strength, and therefore uniquely suitable for use as an interlayer for laminated safety glass.

BACKGROUND ART

Various processes for preparing polyvinyl butyral are well known in the art. For example, French Patent 2,401,941, which is incorporated herein by reference, discloses a process in which polyvinyl alcohol is dispersed in an aqueous solution and reacted with butyraldehyde in the presence of an acid. In particular, an aqueous solution containing polyvinyl alcohol of 8 to 15 percent by weight is reacted at a temperature of from 5° to 12° C. with butyraldehyde in the presence of an acid and an emulsifier. A sufficient amount of butyraldehyde is used in order to react 75 percent to 88 percent of the polyvinyl alcohol in the reaction mixture. This amount is added to the mixture gradually so that the polyvinyl butyral precipitates in the form of particles 10 to 90 minutes after the start of the reaction. The reaction mixture is then agitated for more than 30 minutes at a temperature of 8° to 15° C., after which the reaction process is accelerated by an increase in temperature to between 60° and 80° C., for 1½ to 4 hours. Subsequently, a base is introduced into the reaction mixture to neutralize it to a pH level between 9 and 11 (hereinafter referred to as the "neutralization process"). The reaction is then continued for more than ¼ hour at this temperature. The after-treatment of the polyvinyl butyral is completed by the separation of the final product by filtration, followed by a thorough washing with water.

When the high-quality polyvinyl butyral obtained from the above processes is admixed with a plasticizer, a polyvinyl sheeting results having properties satisfactory for the subsequent handling of the sheeting and performance in a laminar structure such as laminated safety glass. These properties include a reduced tendency to compression flow; exceptional laminar and support strength and impact resistance (e.g., in falling ball tests); enhanced bonding properties to contiguous glass surfaces (e.g., in pummel tests); high transparency properties, and high rigidity.

However, the drawbacks of these processes can be seen when the emulsifier used is a sodium alkylsulfonate or sodium alkylaryl-sulfonate, such as sodium dodecyl-benzene-sulfonate or sodium arylsulfonate. These emulsifiers are necessary to prevent an agglomeration of polyvinyl butyral particles which would greatly diminish the optical quality of the polymer product. Unfortunately, if these emulsifiers are left in the polyvinyl butyral product, they also reduce the product's ability to adhere to glass. As a result, these emulsifiers must be removed in the after-treatment of the polyvinyl butyral product. Typically, this after-treatment is carried out in an aqueous medium under basic conditions, namely, at a pH between 9 and 11. Most frequently, soda is used in this after-treatment to neutralize the acid of the catalyst to the desired pH level. Unfortunately, soda or other substitute chemicals required for the neutralization process significantly increase the cost of the after-treatment process of polyvinyl butyral. In addition, this process prolongs the already lengthy after-treatment process of polyvinyl butyral. Moreover, during after-treatment, the butyraldehyde is condensed to form a number of precipitates, including ethyl-2-hexenal, which has a very unpleasant odor.

Additionally, sheets obtained by the above processes are not sufficiently rigid. This makes them difficult to handle by automatic handling and cutting machines which position and tailor these sheets as required during the manufacture of glass sheets.

SUMMARY OF THE INVENTION

The present invention relates to a process for the preparation of polyvinyl butyral having improved properties and comprises the process disclosed in French Patent 2,401,941 with the additional condition that ethoxylated alkylphenol sulfate (EAS) having the formula

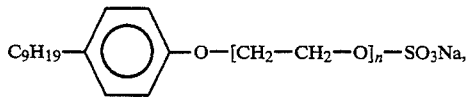

where n=6 or n=7 is used as an emulsifier instead of sodium alkyl-sulfonate or sodium alkylaryl-sulfonate. In another embodiment of the present intention there is the additional condition that the "neutralization process" is discontinued as soon as a pH of approximately 5 is reached.

Advantageously, in the present invention, the emulsifier EAS is completely and inexpensively removed from the polymer by a thorough washing with water at ambient temperature. As a result, a product is inexpensively obtained which has superior adhesiveness to glass materials. In addition, unlike conventional washing processes, the washing process of the invention does not produce ethyl-2-hexenal, which has a very unpleasant odor.

In comparison to conventional emulsifiers, smaller quantities of emulsifier are required to produce identical quantities of polyvinyl butyral. Moreover, the use of EAS effective as an emulsifier substantially decreases the "curing time" of the polyvinyl butyral i.e., the time beginning after the neutralization step until the cooling and washing to a range of 5 to 10 minutes. The period of curing using conventional polyvinyl butyral is generally one hour.

The process of the present invention provides polyvinyl butyral having improved properties. In comparison to polyvinyl butyral prepared using conventional processes, the polyvinyl butyral obtained according to the invention is marked by considerably reduced compression flow, increased laminar and support strength and stiffness, increased impact resistance, increased adhesiveness to contiguous glass surfaces, and increased transparency properties and increased rigidity. Polyvinyl butyral sheeting made from this polyvinyl butyral product is resistant, homogeneous, of good breaking strength, and therefore uniquely suitable for use as an interlayer for laminated safety glass.

DESCRIPTION OF PREFERRED EMBODIMENTS

The present invention relates to a process for the preparation of polyvinyl butyral having improved properties and comprises the process disclosed in French Patent 2,401,941, with the additional conditions that ethoxylated alkylphenol sulfate (EAS) having the formula

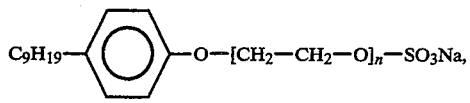

where $n=6$ or $n=7$ is used as the emulsifier instead of a sodium alkylsulfonate or sodium alkylaryl-sulfonate. In particular, the present invention comprises (i) subjecting a polyvinyl alcohol having a content of 8 to 15 percent by weight of vinyl alcohol in an aqueous solution, at a temperature of 5° to 12° C. and in the presence of an acid catalyst and EAS, effective as an emulsifier, to sufficient butyraldehyde, in order to react 75 to 88 percent of the polyvinyl alcohol in the reaction mixture said butyraldehyde being reacted gradually to precipitate said polyvinyl butyral within 10 to 90 minutes after the start of the reaction; (ii) agitating the reaction mixture for more than 30 minutes at a temperature of 8° to 15° C.; (iii) increasing the temperature to between 60° and 80° C. for 1½ to 4 hours; (iv) introducing a base into the-reaction mixture to neutralize it to a pH level of between 9 and 11 continuing the reaction for more than five minutes at this temperature and pH level; and finally (v) subjecting the reaction mixture to an after-treatment which includes separating the polyvinyl butyral from the reaction liquors by filtration, followed by a thorough washing with water. In another embodiment of the present invention the neutralization process is discontinued as soon as a pH of approximately 5 is reached.

A particularly important requirement for improving the properties of the polyvinyl butyral according to the invention is the presence of EAS effective as an emulsifier. Typically, the EAS used is in an amount between 0.10 and 0.30 percent, generally 0.15 percent, by weight calculated on the polyvinyl alcohol. EAS advantageously facilitates the after-treatment of the polyvinyl butyral to separate the product. Unlike conventional emulsifiers which are removed from the polymer by the addition of a base, EAS is completely and inexpensively removed from the polymer by a thorough washing with water. As a result, a product is inexpensively obtained which has superior adhesiveness to contiguous glass materials. Moreover, the washing process can be carried out at a temperature of less than 20° C. Thus, water having an ambient temperature of 15° to 20° C. can be used to wash the emulsifier from the polymer, which minimizes the heat requirements of the after-treatment process of the polyvinyl butyral. In addition, unlike conventional washing processes, the washing process of the invention does not produce ethyl-2-hexenal, which has a very unpleasant odor.

In comparison to conventional emulsifiers, smaller quantities of emulsifier are required to produce identical quantities of polyvinyl butyral. As a result, the process of the present invention prepares a polymer product at a lower cost than prior art processes.

It is a special advantage of the invention that the use of EAS effective as an emulsifier substantially decreases the "curing time" of the polyvinyl butyral after neutralization. The period of curing using conventional polyvinyl butyral processes is generally -one hour. Due to the use of EAS effective as an emulsifier in the present invention, this period is reduced to a range of from 5 to 10 minutes. As a result, the total time required to produce polyvinyl butyral by this invention is 50 to 55 minutes less than by conventional processes.

The processing of polyvinyl butyral obtained according to this invention into bonding sheets is carried out in the usual manner. Plasticizers such as esters of polyhydric alcohols and of polybasic acids are added to the polyvinyl butyral in adequate amounts to obtain sheets of polyvinyl butyral having sufficient flow properties. See, for example, European Patents 0011577 and 0047215, which are incorporated herein by reference.

The manufacture of glass compounds with the aid of bonding sheets containing polyvinyl butyral treated according to the invention may be effected using conventional methods, for example by molding the sheet between two glass panes at a temperature between 120° and 160° C. and a pressure between 5 and 20 bars. Advantageously, the increased stickiness and reduced flow properties of the sheets facilitate the insertion of the sheets between convex glass panes and also reduce the formation of air bubbles in the polyvinyl butyral sheet.

In comparison to polyvinyl butyral prepared using most prior art processes, the polyvinyl butyral obtained according to the invention is marked by considerably reduced compression flow, increased laminar and support strength and stiffness, increased impact resistance, increased adhesiveness to contiguous glass surfaces, increased transparency, and increased rigidity properties as shown by the following examples, in which parts and percentages are by weight unless otherwise indicated. In these examples, the following tests and procedures were used.

Compression flow test: The compression flow of the samples was measured by the following procedure. For each test, two specimens were cut from polyvinyl butyral laminate with a hollow punch. The laminate had a thickness of 0.76 mm (+.01 mm) and the hollow punch had the shape of a disk with a 26-mm diameter. Each specimen was held between the plates of a heating press which was kept at a temperature of 135° C. For 5 minutes, each specimen was heated without application of pressure. Subsequently, a pressure of 10 bars was applied to each sample for a time period of 5 minutes. The diameter of each specimen after the 10-minute test was recorded and the compression flow for each specimen was calculated according to the following formula:

$$F=(D-26)/26\times 100$$

where:

D is the diameter (within 0.25 mm) of the specimen after the 10-minute flow test The average for the two specimens was reported for the sample. An average of at least 60 percent is required before the polyvinyl butyral laminate can be used as an interlayer in safety glass.

Pummel test: The pummel adhesion of the samples was measured by the following procedure. For each test, a 30.5-cm-square specimen was cut from a polyvinyl butyral laminate having a thickness of 0.76 min. The moisture level of the laminate was preconditioned in a usual manner to have a level prescribed for conventional pummel tests. The square specimen was placed between two 30.5-cm-square glass sheets, each having a thickness of 3 mm. The polyvinyl butyral/glass laminate was then compressed under a pressure of 10 bars at a temperature of 138° C. for 20 minutes. A fraction of the specimen, typically having dimensions of 15 by 30 cm, was then subjected to the pummel test. First, this fraction of the specimen was cooled for 8 hours at a temperature of −18° C. It was then held in a pummel testing machine at a 45 angle to a supporting table. A force was evenly applied over a 10 by 15 cm area of the sample with a 450-g flathead hammer at a predetermined rate until the glass became pulverized. Once the glass pulverized, the glass remaining glued to the polyvinyl butyral was compared with a list of formal standards. These standards comprise a scale ranging from 0 to 10 and are given as:

| % of the Surface of the Polyvinyl Butyral Sheet That Came Unglued During Breaking | Pummel Values |
| --- | --- |
| 100 | 0 |
| 95 | 1 |
| 90 | 2 |
| 85 | 3 |
| 60 | 4 |
| 40 | 5 |
| 20 | 6 |
| 10 | 7 |
| 5 | 8 |
| 2 | 9 |
| 0 | 10 |

The pummel test was performed on both surfaces of the laminated glass and a pummel value recorded for each surface tested. In general, good impact performance is attained at a pummel adhesion of greater than 5 for each surface, i.e., 5+5.

Falling ball test: The impact resistance of the samples was measured by the following procedure. Samples were prepared using the general procedure outlined in the description of the pummel test. Each polyvinyl butyral/glass laminate sample was kept at a temperature of 21° C. (±2°). It was then placed on a wooden frame so that the surface of the laminate was contiguous to the surface of the wooden frame. A force was applied to the sample by dropping a 2,270 gram steel ball from a predetermined height onto the central part of the polyvinyl butyral/glass laminate. The energy of each application of force was increased by increasing the height from which the steel ball was dropped. The height required for the dropped steel ball to penetrate the laminate to a depth of 10 percent was recorded. Impact performance is considered to be satisfactory when this height is greater than or equal to 5.18 meters (17 feet).

Test to determine haze: The haze of a transparent laminate is the percentage of luminous flux traveling through the laminate which is scattered at an angle of more than 2.5 degrees from the axis defined by the unscattered light path. The haze of the polyviny butyral/glass laminate was measured according to standard NF-54-111, which is in agreement with method A of standard ASTM D 1003-61. Samples for this test were prepared using the general procedure outlined in the description of the pummel test. In general, the optical properties required for polyvinyl butyral/glass laminates to be used as safety glass are attained at a haze test result of less than or equal to .3 percent.

Moisture resistance test: The moisture resistance of the samples was measured by the following procedure. Samples were prepared using the general procedure outlined in the description of the pummel test. Each sample was then boiled in water for 2 hours. It was then removed from the water and examined for formations of bubbles or white, translucent streaks on the periphery of the sample. In general, the absence of these formations indicates that the laminate has attained a good moisture resistance.

Rigidity test: The rigidity of the samples was measured by the following procedure. For each test, a 30×5 cm-square specimen was cut from a polyvinyl butyral laminate having a thickness of 0.76 min. The ends of each sample were then glued together so that each sample formed a loop. The loop was then placed in an upright position into an enclosure having a temperature of 17° C. The time required for the highest point of the loop to sag until it came into contact with the lowest point of the loop was recorded in seconds.

EXAMPLES

The following examples serve to illustrate the property of sheets using the process disclosed in French Patent 2,401,941.

EXAMPLE 1

30 kg of a polyvinyl alcohol were stirred in a mixture of 300 liters of water, 67.5 g of sodium dodecylbenzene sulfonate, and 2.65 kg of hydrochloric acid having a density of 1.18 g/cc at a temperature of 10° C. 17.1 kg of butyraldehyde were then gradually reacted with the mixture over a time period of approximately 30 minutes. This reaction increased the temperature of the reaction mixture by a few degrees, changed its color to a whitish hue, and increased its viscosity. Near the end of this time period, polyvinyl butyral started to precipitate in the form of particles and the viscosity of the mixture started to decrease. The mixture was then allowed to stand for 30 minutes at a temperature of 13° C. Subsequently, the temperature was increased to 70° C. over a time period of 90 minutes. Next, the mixture was neutralized with 1.35 kg of soda to a pH of 10. This mixture was kept at a temperature of 70° C. for 60 minutes and was then washed several times with water having a temperature of 70° C. The polymer was filtered off with suction and dried in hot air.

Subsequently, the polymer was mixed with a plasticizer such as benzyl and octyl adipate using methods known in the art. Sheets having a predetermined thickness were molded from the extruded product. The following table shows selected properties of the resulting polymer sheets.

| | |
| --- | --- |
| Proportion of hydroxyl* | 17.5% |
| Proportion of ethyl-2-hexenal* | 1.06% |
| Flow* | 63% |
| Ball drop* | 5.8 M |
| Pummel*, ** | 5 + 5 |
| Haze* | .29 |
| Rigidity* | 6.9 seconds at 17° C. |

*determination according to the samples and tests outlined in the previous discussions.
**poorly washed samples yielded a pummel index of 1 + 1, which indicates an insufficient bond.

EXAMPLE 2

The general procedure of Example 1 was repeated except that the mixture was neutralized with soda to a pH of 5. Selected properties of the resulting polymer sheets are shown in the following table.

| Proportion of hydroxyl* | 19.2% |
|---|---|
| Proportion of ethyl-2-hexenal* | 0.06% |
| Flow* | 63% |
| Ball drop* | 6.6 M |
| Pummel*, ** | 1 + 2 |
| Haze* | .3 |
| Rigidity* | 7 seconds at 17° C. |

*cf. Example 1.
**poorly washed samples yielded a pummel index of 0 + 0, which shows that significant amounts of emulsifier remained in the polyvinyl butyral sheet, i.e., the emulsifier was poorly eliminated by washing.

The following examples serve to illustrate the invention. Properties of sheets obtained using the invention can be compared to properties of sheets obtained using the control processes of Examples 1 and 2.

EXAMPLE 3

The general procedure of Example 1 was repeated except that (i) 100 g of EAS (marketed under the name CELANOL 252 by the French company SFOSS) were used as the emulsifier instead of sodium dodecylbenzene sulfonate and (ii) the reaction mixture was washed with water at ambient temperature. Selected properties of the resulting polymer sheets are shown in the following table.

| Proportion of hydroxyl* | 19.3% |
|---|---|
| Proportion of ethyl-2-hexenal* | 0.50% |
| Flow* | 63% |
| Ball drop* | 5.8 M |
| Pummel*, ** | 6 + 7 |
| Haze* | .28 |
| Rigidity* | 6 seconds at 17° C. |

* cf. Example 1.
*poorly washed samples yielded a pummel index of 4 + 4.

The significance of Example 3 in comparison to Example 1 is that under identical conditions with the neutralization process being carried out to a pH level of about 10, the use of EAS effective as an emulsifier yields a product of superior quality in pummel value and of equivalent quality in all other respects, including the rigidity of the product.

EXAMPLE 4

The general procedure of Example 3 was repeated except that the product was washed with water at a temperature of 70° C. Selected properties of the resulting polymer sheets are shown in the following table.

| Proportion of hydroxyl* | 19.3% |
|---|---|
| Proportion of ethyl-2-hexenal* | 0.80% |
| Flow* | 61% |
| Ball drop* | 5.8 M |
| Pummel*, ** | 6 + 6 |
| Haze* | .27 |
| Rigidity* | 6 seconds at 17° C. |

*cf. Example 1.
*** poorly washed samples yielded a pummel index of 3 + 4.

The significance of Example 4 in comparison to Example 3 is that washing with warm water does not significantly change the properties of the polymer. It is a special advantage of this invention that a product having high qualities can be obtained by washing with water at ambient temperature.

EXAMPLE 5

The general procedure of Example 3 was repeated except that 50 g of EAS were used and the neutralization process was discontinued as soon as a pH of approximately 5 was reached. Selected properties of the resulting polymer sheets are shown in the following table.

| Proportion of hydroxyl* | 20.1% |
|---|---|
| Proportion of ethyl-2-hexenal* | 0.05% |
| Flow* | 58% |
| Ball drop* | 6.6 M |
| Pummel*, ** | 7 + 8 |
| Haze* | .27 |
| Rigidity* | 25.4 seconds at 17 |

*cf. Example 1.
*poorly washed samples yielded a pummel index of 5 + 5.

The significance of Example 5 in comparison to Example 3 is that smaller quantities of emulsifiers yield a product of superior quality in pummel value and rigidity and of equivalent quality in all other respects with the exception of proportion of ethyl-2-hexenal in the product.

EXAMPLE 6

The general procedure of Example 5 was repeated except that the curing time of the polyvinyl butyral, after neutralization, was limited to approximately 5 minutes. Selected properties of the resulting polymer sheets are show; in the following table

| Proportion of hydroxyl* | 19.3% |
|---|---|
| Proportion of ethyl-2-hexenal* | 0.04% |
| Flow* | 61% |
| Ball drop* | 6.6 M |
| Pummel*, ** | 6 + 7 |
| Haze* | .29 |
| Rigidity* | 24 seconds at 17° C. |

*cf. Example 1.
**poorly washed samples yielded a pummel index of 4 + 5.

The significance of Example 6 in comparison to Example 5 is that the curing time of the polyvinyl butyral can be greatly reduced without altering the superior qualities of the polymer.

What is claimed is:

1. A process for producing polyvinyl butyral which comprises treating polyvinyl alcohol in an aqueous medium in the presence of an acid catalyst and an emulsifier of ethoxylated alkylphenol sulfate with butyraldehyde to form a reaction mixture, neutralizing the reaction mixture to raise the pH of the mixture to about 5, recovering polyvinyl butyral from the reaction mixture, and washing the polyvinyl butyral with water at ambient temperature to obtain polyvinyl butyral, wherein said emulsifier is an ethoxylated alkylphenol sulfate having the formula

$$C_9H_{19}-C_6H_4-O-(CH_2-CH_2-O)_n-SO_3Na$$

where n=6 or 7, said sulfate being present in an amount of between about 0.1 and 0.3 percent by weight of said polyvinyl alcohol, whereby said neutralizing step and recovery of polyvinyl butyral is performed in about 5 to 10 minutes.

2. The process of claim 1 wherein said polyvinyl alcohol comprises about 8 to 15 percent by weight of said aqueous medium, said aqueous medium of polyvinyl alcohol, acid catalyst, and emulsifier having a temperature of 5° to 12° C.; said butyraldehyde comprises a sufficient weight to react 75 to 88 percent of said polyvinyl alcohol in said aqueous medium; said butyraldehyde being reacted gradually to precipitate said polyvinyl butyral within a time period ranging from about 10 to 90 minutes after the start of said reaction; subsequently agitating said reaction mixture for a time period greater than 30 minutes at a temperature of 8° to 15° C., the temperature of said reaction mixture then being raised to a temperature range between 60° to 80° C. for a period of time between 1½ and 4 hours; incorporating a base into said reaction mixture to neutralize said reaction mixture to a pH of between 9 and 11; curing said reaction mixture between 60° C. and 80° C. for a period of no more than about 5 minutes; and recovering precipitated polyvinyl butyral from said reaction mixture by washing with water.

3. The process of claim 2 wherein said precipitated polyvinyl butyral is recovered from said reaction mixture by washing with water at ambient temperature.

4. The process of claim 1 wherein said acid catalyst comprises hydrochloric acid.

5. The process of claim 1 wherein said ethoxylated alkylphenol sulfate is present in an amount of about 0.15 percent by weight calculated on polyvinyl alcohol.

6. The process of claim 2 wherein the time duration of said curing phase, after neutralization, is between 5 and 10 minutes.

7. A polyvinyl butyral obtained by the process of claim 1.

8. A polyvinyl butyral obtained by the process of claim 2.

9. A plasticized polyvinyl butyral sheet comprising polyvinyl butyral and plasticizing material wherein said polyvinyl butyral is obtained by the process of claim 1.

10. A plasticized polyvinyl butyral sheet comprising polyvinyl butyral and plasticizing material wherein said polyvinyl butyral is obtained by the process of claim 2.

11. A process for producing polyvinyl butyral which comprises:

forming a reaction mixture of an aqueous solution of about 8 to 15 by weight percent polyvinyl alcohol with butyraldehyde in the presence of an acid catalyst and an ethoxylated alkylphenol sulfate emulsifier of from about 0.1 to 0.3 percent by weight calculated on polyvinyl alcohol at a temperature of from about 5° to 12° C. for a sufficient time to react about 75 to 88 percent of the polyvinyl alcohol in the mixture;

agitating the reaction mixture;

increasing the temperature of said mixture to from about 60° to 80° C. for at least about 1½ hours;

adding a base to the reaction mixture to neutralize the reaction mixture to a pH of at least about 9;

washing the reaction mixture with water to completely remove the emulsifier; and recovering polyvinyl butyral.

12. The process of claim 11 wherein the reaction mixture is neutralized to a pH of about 9 to 11.

13. The process of claim 11 wherein the temperature of the water in the washing step is less than 20° C.

14. In a process of preparing polyvinyl butyral from an aqueous solution of polyvinyl alcohol, butyraldehyde, an acid catalyst, and an emulsifier, the improvement which comprises reducing the curing time of polyvinyl butyral by utilizing ethoxylated alkyl phenol sulfate as the emulsifier in an amount of between about 0.1 and 0.3 percent by weight calculated on polyvinyl alcohol.

15. The process of claim 11 wherein the emulsifier is $C_9H_{19}$-$C_6H_4$-O-$(CH_2$-$CH_2$-O$)_n$$SO_3Na$ where n=6 or n=7 and is present in an amount of about 0.15 percent by weight of the amount of polyvinyl alcohol.

16. The process of claim 14 wherein the emulsifier is $C_9H_{19}$-$C_6H_4$-O-$(CH_2$-$CH_2$-O$)_n$$SO_3Na$ where n=6 or n=7 and is present in an amount of about 0.15 percent by weight of the amount of polyvinyl alcohol.

* * * * *